Aug. 29, 1967   P. F. FINNEY   3,338,752

THERMOCOUPLE

Filed Nov. 23, 1962

Inventor
Philip F. Finney
By Snow and Benno
Attys.

United States Patent Office 3,338,752
Patented Aug. 29, 1967

3,338,752
THERMOCOUPLE
Philip F. Finney, Villa Park, Ill., assignor to Thermo-Couple Products Company, a corporation of Illinois
Filed Nov. 23, 1962, Ser. No. 239,636
10 Claims. (Cl. 136—233)

This invention relates to a new and improved thermocouple assembly.

Recent scientific advancements have made necessary the use of high temperature thermocouples. These thermocouples are generally of the type known as metal sheathed, ceramic insulated thermocouples and employ conductor metals such as tungsten and tungsten-rhenium. More particularly atomic reactors and nuclear development programs have necessitated the development of thermocouples capable of measuring extremely high temperatures. The use of metals such as previously employed in thermocouples is no longer adequate in view of the high temperature to which thermocouples are now subjected. The materials previously used in thermocouples have melting temperatures far beneath the temperatures attained in atomic and nuclear developments. Metals, such as tungsten and tungsten-rhenium although having extremely high melting points are also characterized by an extreme brittleness. This brittlenes makes it very difficult to successfully embody these high temperature metals in thermocouples of ordinary design.

It is a primary object of the present invention to provide a metal sheathed thermocouple assembly in which the metal thermocouple conductors have an extremely high melting point and are maintained in the sheathed assembly in parallel relationship without any bends therein.

Another important object of this invention is the provision of a thermocouple assembly in which a metal sheath is employed and refractory insulation material is employed to hold the thermocouple conductor wires in parallel relationship in substantially centrally disposed position within the metal sheath.

Still another important object of this invention is to equip a thermocouple assembly with a metal sheath having a refractory insulation material in one end thereof for holding the thermocouple conductors in spaced apart parallel relationship and having in the other end thereof a metal plug with spaced apart passageways in general alignment with the spaced wires held by the insulation material and further including a weld seal over the end of the metal sheath carrying the metal plug and the included thermocouple conductor wires.

A still further important object of this invention is to supply a metal sheathed, refractory insulated thermocouple assembly with mating metal plugs adapted to complement each other and hold the thermocouple conductors in parallel, spaced apart relationship, and the composite plug adapted to snugly fit within one end of the metal sheath.

Still another important object of this invention is to provide two identical mating refractory metal plugs for insertion within the end of a metal sheath housing a thermocouple assembly and wherein the mating plugs are equipped with spaced apart opposing V-notches to receive the thermocouple conductors and hold them in parallel spaced relationship and further including a weld seal over the end of the sheath and its included mating plugs and thermocouple conductors.

Another and still further important object of this invention is the provision of a thermocouple assembly having a metal sheath carrying spaced apart parallel thermocouple conductors extending substantially the full length of the sheath, and the sheath filled with a refractory insulation material in one end thereof and mating semi-cylindrical metal plugs in the other end thereof.

Another important object of this invention is to have mating plugs with opposing V-notches therein in spaced apart parallel relationship and the plugs joining together to constitute a cylinder and providing for parallel passageways for the thermocouple conductors.

A still further important object of this invention is to supply a cylindrical plug insertable in one end of a metal sheath and a refractory insulation material positioned in the other end thereof and the sheath further having a weld seal over the plugged end thereof joining the sheath, the metal plugs and the included thermocouple conductors.

Other and further important objects and advantages will become apparent from the disclosures in the following specification and accompanying drawing.

In the drawing:

(FIGURE 2 is further identified by the line 2—2 on FIGURE 3.)

As shown in the drawing:

Figure 1:
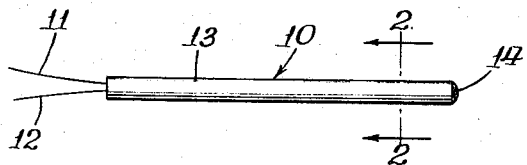
FIGURE 1 is a side elevational view of a thermocouple assembly of the type defined in this application.

The reference numeral 10 indicates generally a thermocouple assembly of this invention. The thermocouple is provided with high melting point thermocouple conductor wires 11 and 12. These materials may be any one of several suitable metals but for convenience it will be sufficient to identify the conductors as tungsten and tungsten-rhenium. The thermocouple conductors are adapted to pass through a metal sheath 13. The metal sheath is in the form of a sleeve through which the conductors 11 and 12 pass from one end to the other. A weld seal 14 is adapted to make the thermoelectric junction and simultaneously acts to enclose the end of the metal sheath 13 and thereby seal the wires 11 and 12 to the thermocouple assembly.

The rearward end of the metal sheath 13 is filled with a refractory insulation material 15 that is placed in and around the frangible metal wires 11 and 12. The wires 11 and 12 are preferably disposed in spaced apart parallel relationship throughout the full length of the metal sheath 13. This parallelism and absence of bends contribute to long life of the thermocouple elements. Also, the lack of bending of the wires prevents to a great extent the breaking because of the brittleness which is inherent in tungsten and other high melting point metals and which is accentuated by the high heat to which the thermocouple assembly is exposed in its use. The refractory insulation such as a ceramic material terminates short of the welded end of the sheath 13.

Figure 2:
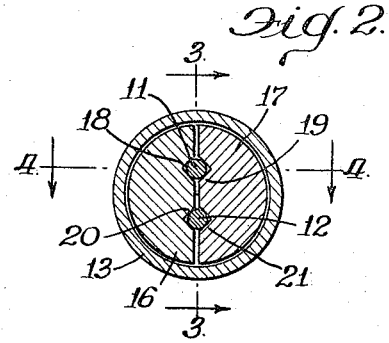
FIGURE 2 is a sectional view taken on the line 2—2 of FIGURE 1.
Figure 3:
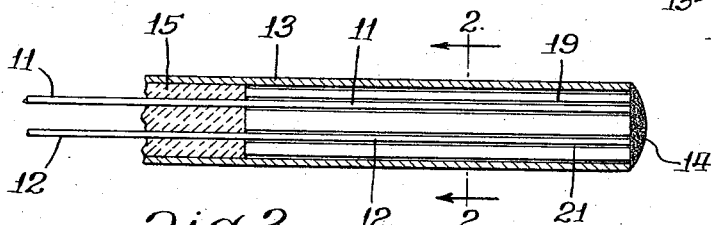
FIGURE 3 is a sectional view taken on the line 3—3 of FIGURE 2.
Figure 4:
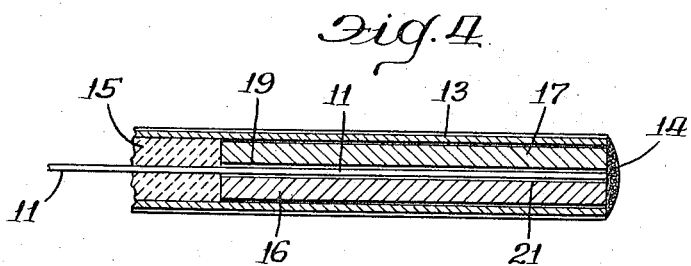
FIGURE 4 is a sectional view taken on the line 4—4 of FIGURE 2.
Figure 5:
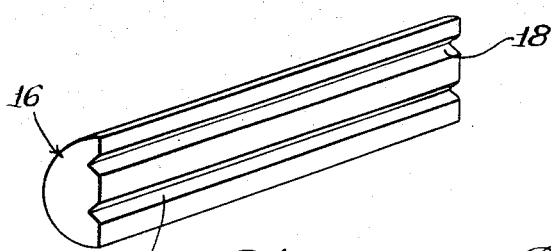
FIGURE 5 is an isometric view of one of two identical mating refractory metal plugs employed in the thermocouple assembly of this invention.

The weld end of the sheath is filled with two identical mating refractory metal plugs 16 and 17. These metal plugs as well as the metal sheath are preferably made of molybdenum but it should be understood that other suitable metals may be employed. The mating plugs are complementary and combine to form one pair of opposing V-notches 18 and 19 and a spaced apart pair of opposing V-notches 20 and 21 as shown in FIGURES 2 and 5. The molybdenum mating plugs 16 and 17 are preferably provided with a relatively snug or at least a close fit within the radial space provided within the outer sheath 13 and the longitudinal space defined at one end by the terminal ending of the refractory insulation material 15 and defined at its other end by the weld seal 14.

It is not contemplated in this invention that the mating plugs 16 and 17 must be identical but rather should be complementary to form longitudinal passageways for the thermocouple conductors and to substantially hold those conductors from vibration or bending in any respect. The combined outer surfaces of the complementary semi-cylindrical mating refractory metal plugs 16 and 17 form a cylindrical plug means which substantially fills the space within the sheath from the end of the refractory insulation material to the outer weld seal. However, the outer conformation of the plug means may be polygonal or some other shape which will have portions thereof engaging the internal surfaces of the sheath 13 to prevent shifting movement of the retained thermocouple conductors during use of the assembly as a thermocouple. Similarly, opposing V-notches 18 and 19 and 20 and 21 may comprise other shapes which will equally support the brittle, frangible metal used to effect a thermocouple. It is unlikely that a wedging of the thermocouple conductors can be accomplished by the two-piece plug as described herein because of the physical nature of the thermocouple conductors and the materials used for the plug and the outer sheath. This is true especially in thermocouple assemblies used to record extremely high temperatures. In testing for temperatures of lower ranges thermocouples may employ plugs of different metals made oversized and the opposing notches made somewhat smaller so that when the conductors are held between the plugs and the plugs are driven into the sheath 13 there is accomplished a mechanical juncture effecting a thermocouple. However, in the thermocouples used for high temperatures the metals known to be effective are brittle in character and require holding against vibration or other shifting during use, and the thermocouple junction is accomplished by the end weld seal 14.

Applicant herein has developed a thermocouple assembly especially usable for reading high temperatures and preserving the life thereof by encompassing the naturally frangible thermocouple conductors within an outer metal sheath. The conductor wires are held by a refractory insulation material and further held by complementary notched plug means in such a manner that the thermocouple conductors remain in spaced apart parallel position throughout the entire length of the sheath. It is this confinement of the thermocouple conductors in parallelism and a reliance of the fusion weld 14 at the outer end of the sheath and the included mating metal plugs 16 and 17 which in turn carry the inner included parallel thermocouple conductors 11 and 12 which create the very desirable thermocouple assembly of this invention.

I am aware that numerous details of construction may be varied throughout a wide range and I therefore do not propose limiting the patent granted hereon otherwise than as necessitated by the appended claims.

What is claimed is:

1. A thermocouple assembly comprising a tubular metal sheath, two metal thermocouple conductors disposed in spaced apart generally parallel relationship substantially centrally within said sheath and terminating substantially coextensively with one end of said sheath, a non-metallic refractory insulation material filling a portion of said sheath around said conductors and terminating short of the one end of said sheath, two complementary metal plugs combining to substantially fill the space within said sheath from the end of the non-metallic refractory insulation material to the one end of the sheath, the adjoining faces of the metal plugs having opposing V-notches running the length thereof and disposed generally parallel and in spaced apart relationship a distance substantially equal to the spacing of said conductors, said conductors disposed in and confined within the opposing V-notches and the one end of said sheath having a weld seal thereover covering the sheath and the included plugs and conductors.

2. A thermocouple assembly comprising a generally cylindrical metal sheath, two metal thermocouple conductors disposed in spaced apart generally parallel relationship substantially centrally within said sheath and terminating substantially coextensively with one end of said sheath, a non-metallic refractory insulation material filling a portion of said sheath around said conductors and terminating short of the one end of said sheath, generally cylindrical metal plug means substantially equal in size to the space within said sheath from the end of the non-metallic refractory insulation material to the one end of the sheath, the plug means having spaced passageways running the length thereof and disposed generally parallel and in spaced apart relationship a distance substantially equal to the spacing of said conductors, said plug means positioned within said sheath and confining said conductors within the spaced passageways and the one end of said sheath having a weld seal thereover covering the sheath and the included plug means and conductors.

3. A thermocouple assembly comprising a generally cylindrical metal sheath, two metal thermocouple conductors disposed in spaced apart generally parallel relationship substantially centrally within said sheath and terminating substantially coextensively with one end of said sheath, a non-metallic refractory insulation material filling a portion of said sheath around said conductors and terminating short of the one end of said sheath, two semi-cylindrical mating metal plugs substantially equal in size to the space within said sheath from the end of the non-metallic refractory insulation material to the one end of the sheath, the adjoining faces of the mating plugs having opposing V-notches running the length thereof and disposed generally parallel and in spaced apart relationship a distance substantially equal to the spacing of said conductors, said plugs positioned within said sheath and confining said conductors within the opposing V-notches, and the one end of said sheath having a weld seal thereover covering the sheath and the included plugs and conductors.

4. In a thermocouple assembly for high temperature use comprising, two frangible electrically conductive materials having the further properties of high melting points and capable at a junction thereof of exhibiting the Seebeck effect, a tubular sheath formed of one of said materials, a pair of straight conductors formed of the other of said materials, insulation means carrying said conductors in said sheath in a parallel spaced apart relationship with said insulating means terminating short of one end of said sheath and with said conductors terminating substantially at said one end of said sheath, two complementary plug members formed of said one of said materials and in cooperation defining a pair of parallel spaced apart passageways for said conductors of sizes sufficiently small to prevent any substantial transverse movement of said conductors in said passageways, said plug members carried in said one end of said sheath to terminate at said one end of said sheath and having an outer peripheral shape sufficiently large to prevent any substantial transverse movement of said plug members in said sheath and defining one electrical path between said conductors and said sheath, said plug members being constructed and arranged to maintain said conductors throughout substantially their entire length thereof in spaced relation to said sheath, and a weld seal covering said one end of said sheath and the ends of said conductors and said plug members to define another electrical path and a thermoelectric junction therebetween.

5. A thermocouple assembly comprising a tubular sheath, two thermocouple conductors disposed in spaced apart relationship within said sheath and terminating substantially coextensively with one end of said sheath, a non-metallic refractory insulation material filling a portion of said sheath around said conductors and terminating short of the one end of said sheath, two mating plugs of electrically conductive material substantially equal in cross sectional area to the cross sectional area within said sheath, the adjoining faces of the mating plugs having opposing notches running the length thereof in spaced apart relationship a distance substantially equal to the spacing of said conductors, and said plugs positioned within said sheath and confining said conductors within the opposing notches in such a manner as to accomplish an electrical path and a mechanical junction effecting a thermocouple and being constructed and arranged to maintain said conductors throughout substantially their entire length thereof in spaced relation to said sheath.

6. A thermocouple assembly comprising a generally cylindrical metal sheath, two metal thermocouple conductors disposed in spaced apart generally parallel relationship substantially centrally within said sheath and terminating substantially coextensively with one end of said sheath, a non-metallic refractory insulation material filling a portion of said sheath around said conductors and terminating short of the one end of said sheath, two semi-cylindrical mating metal plugs substantially equal in size to the space within said sheath from the end of the non-metallic refractory insulation material to the one end of the sheath, the adjoining faces of the mating plugs having opposing V-notches running the length thereof and disposed generally parallel and in spaced apart relationship a distance substantially equal to the spacing of said conductors, and said plugs positioned within said sheath and confining said conductors within the opposing V-notches to effect a thermocouple.

7. A thermocouple assembly comprising a tubular sheath, two thermocouple conductors disposed in spaced apart relationship within said sheath and terminating adjacent one end of said sheath, a non-metallic refractory insulation material filling a portion of said sheath around said conductors and terminating short of the one end of said sheath, two electrically conductive mating plugs substantially equal in cross sectional area to the cross sectional area within the sheath, the adjoining faces of the mating plugs having opposing notches running the length thereof in spaced apart relationship a distance substantially equal to the spacing of said conductors, said plugs positioned within said sheath and confining said conductors within the opposing notches and defining one electrical path between said conductors and being constructed and arranged to maintain said conductors throughout substantially their entire length thereof in spaced relation to said sheath, and electrically conductive means at the free ends of said plugs interconnecting said conductors to define another electrical path therebetween.

8. In a thermocouple assembly for high temperature use comprising, two frangible electrically conductive materials having the further properties of high melting points and capable at a junction thereof of exhibiting the Seebeck effect, a tubular sheath formed of one of said materials, a conductor formed of the other of said materials, insulator means carrying said conductor in said sheath and terminating short of one end of said sheath and with said conductor terminating substantially at said one end of said sheath, two complementary plug members formed of said one of said materials and in cooperation defining a passageway for said conductor of a size sufficiently small to prevent any substantial transverse movement of said conductor in said passageway, said plug members carried in said one end of said sheath to terminate at said one end of said sheath and having an outer peripheral shape sufficiently large to prevent any substantial transverse movement of said plug members in said sheath and defining one electrical path between said conductor and said sheath and being constructed and arranged to maintain said conductor throughout substantially its entire length thereof in spaced relation to said sheath, and a weld seal covering said one end of said sheath and the end of said conductor and said plug members to define another electrical path therebetween.

9. A thermocouple assembly comprising a generally tubular metal sheath of electrically conductive material, an electrically conductive thermocouple conductor disposed substantially centrally within said sheath throughout its entire length and terminating adjacent one end of the sheath, a non-metallic refractory insulation material filling a portion of said sheath around said conductor and terminating short of the one end of said sheath and of said conductor, electrically conductive plug means substantially equal in cross sectional area to the cross sectional area within said sheath and extending substantially the entire distance between said insulation material and the one end of the sheath, said plug means having an opening extending longitudinally therethrough and receiving said conductor in confining relationship therewith, and said plug means defining an electrical path between said conductor and sheath and being constructed and arranged to maintain said conductor throughout substantially its entire length thereof in spaced relation to said sheath.

10. A thermocouple assembly comprising a tubular sheath, two thermocouple conductors disposed within said sheath and terminating adjacent one end thereof, a non-metallic refractory insulation material filling a portion of said sheath around said conductors and insulating the conductors from each other and from said sheath, said insulation material terminating short of the end of the sheath and the ends of the conductors, electrically conductive plug means substantially equal in cross sectional area to the cross sectional area within said sheath and positioned between said insulation material and the one end of the sheath, said plug means having passageway means extending longitudinally therethrough and receiving said conductors in confining relationship therewith and defining an electrical path between said conductors and being constructed and arranged to maintain said conductors throughout substantially their entire length thereof in spaced relation to said sheath, and electrically conductive means at the end of said plug means adjacent to the end of the sheath interconnecting said conductors to define another electrical path therebetween.

References Cited
UNITED STATES PATENTS

| | | |
|---|---|---|
| 3,007,989 | 11/1961 | Nicholson et al. ___ 136—235 X |
| 3,007,990 | 11/1961 | Ihnat _____ 136—236 X |
| 3,048,641 | 8/1962 | Erlebacher _____ 136—232 |
| 3,055,961 | 9/1962 | Robertson et al. ___ 136—234 X |

ALLEN B. CURTIS, *Primary Examiner.*

W. A. DOUGLAS, *Assistant Examiner.*